United States Patent [19]  [11] 4,131,174
Rickards  [45] Dec. 26, 1978

[54] HEAVE ALLEVIATION AND CONTROL DEVICE FOR A SURFACE EFFECT SHIP

[75] Inventor: Michael A. Rickards, La Jolla, Calif.

[73] Assignee: Rohr Industries, Incorporated, Chula Vista, Calif.

[21] Appl. No.: 821,694

[22] Filed: Aug. 4, 1977

[51] Int. Cl.² ............................................... B60V 1/11
[52] U.S. Cl. .................................... 180/118; 180/121
[58] Field of Search ............... 180/118, 120, 121, 124, 180/127; 114/67 A

[56] References Cited

U.S. PATENT DOCUMENTS

| | | | |
|---|---|---|---|
| 3,174,569 | 3/1965 | Eggington | 180/118 |
| 3,244,244 | 4/1966 | Cockerell | 180/128 |
| 3,363,718 | 1/1968 | Hammett | 180/124 X |
| 3,424,266 | 1/1969 | Cockerell | 180/127 X |
| 3,465,844 | 9/1969 | Page | 180/118 |
| 3,805,913 | 4/1974 | Jackes | 180/120 X |
| 3,907,061 | 9/1975 | Chapman | 180/120 X |
| 4,029,036 | 6/1977 | Magnuson | 114/67 A |

Primary Examiner—Joseph F. Peters, Jr.
Assistant Examiner—Terrance L. Siemens
Attorney, Agent, or Firm—Patrick J. Schlesinger; Frank D. Gilliam

[57] ABSTRACT

A heave alleviation and control device for a surface effect ship having a central plenum chamber pressurized from a source of pressure interconnected to a stern seal plenum chamber by a duct. The duct contains a first valve positioned between the inlet from the central plenum chamber and the outlet to said stern seal plenum chamber for controlling the flow of pressurized gas therethrough. The rear wall of the duct has an opening therethrough to the atmosphere. A second valve is positioned adjacent the opening within the duct to control the flow of gas under pressure therethrough. The two valves are interconnected by levers to a piston translatable within a cylinder for simultaneous movement with the piston. One side of the piston is exposed to the central plenum chamber pressure and the opposite side is exposed to a source of hydraulic fluid under a preselected pressure. Directional movement of the piston is provided by the pressure differential between the sides of the piston.

9 Claims, 3 Drawing Figures

HEAVE ALLEVIATION AND CONTROL DEVICE FOR A SURFACE EFFECT SHIP

BACKGROUND OF THE INVENTION

The invention herein described was made in the course of or under contract or subcontract thereunder with the U.S. Navy Department.

The invention generally applies to surface effect ships and more specifically to controlling the pressures in both the main support and passive stern seal plenum chambers.

The present state of the art is generally directed toward skirted seals of flexible material at the sidewall interface and require a separate energy source rather than the cushion pressure itself for actuation of the skirted seal components.

An exception to the above is found in U.S. Pat. No. 3,648,799; however, this teaching employs a fluidic network involving cushion compartmentation and requires a pressure source other than cushion pressure.

SUMMARY OF THE INVENTION

The subject invention proposes to employ a planing stern seal as a large vent valve control for the cushions of a surface effect ship for reducing fluctuations in cushion pressure due to wave pumping and in general for establishing an average cushion pressure setting. When used with the passive stern seal, the cushion pressure is the single source of actuation for the stern seal.

It is an object of the present invention to provide a heave alleviation and control device for a surface effect ship that utilizes cushion pressure alone.

A further object is to provide a heave alleviation and control device for a surface effect ship that is simple to construct, provides manual override control as well as automatic control and can be provided at a low economic cost.

DESCRIPTION OF THE DRAWINGS

Through the various figures, the same reference numeral will be utilized to denote the same element or part.

DESCRIPTION OF THE FIRST PREFERRED EMBODIMENT

Figure 1:
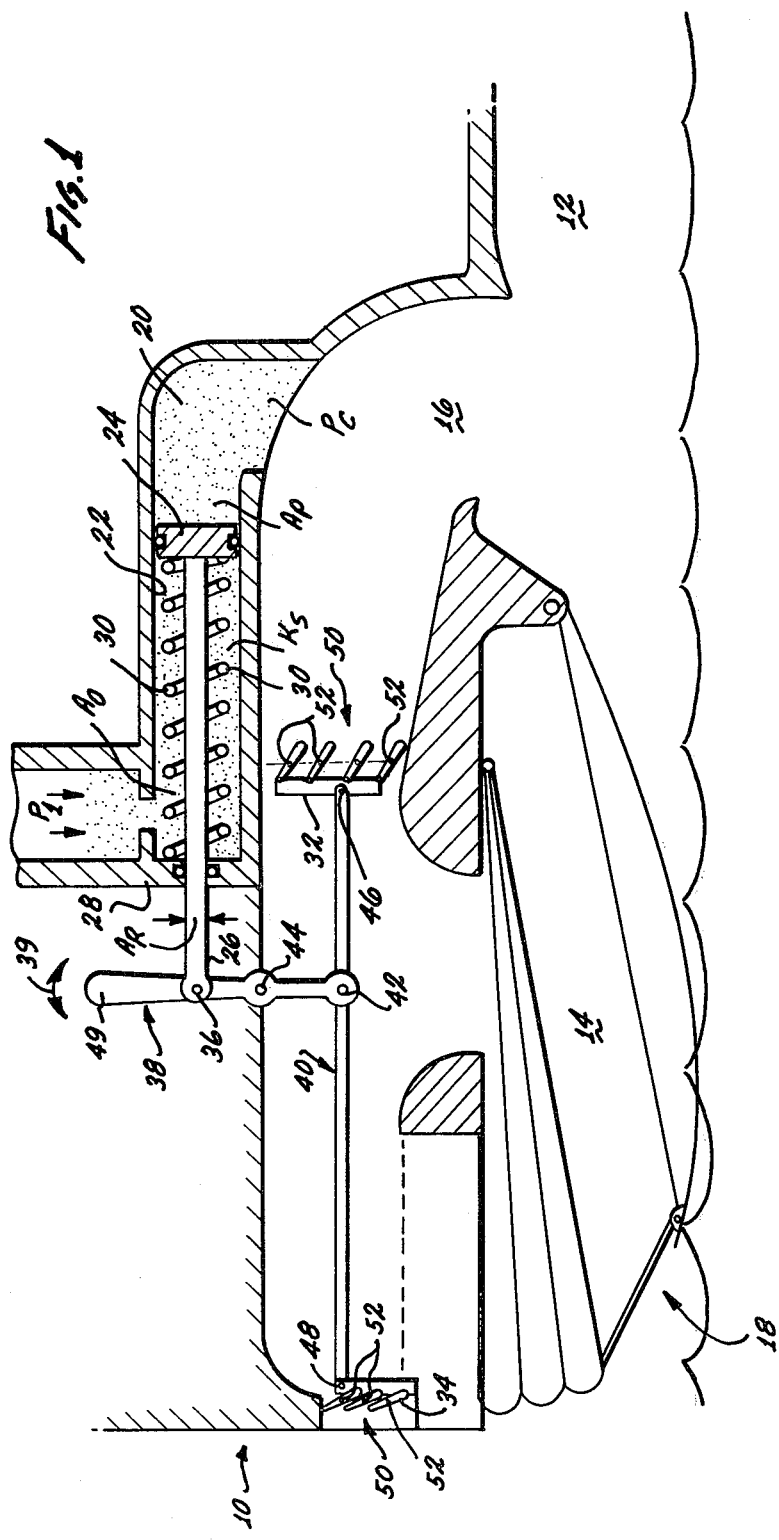
FIG. 1 shows a partial cutaway of the stern of a surface effect ship employing a first embodiment of the instant invention.

Referring now to FIG. 1, the lower stern portion 10 of a surface effect ship is shown in cross-section. A central plenum chamber 12 (partially shown) is interconnected to a rear stern seal plenum chamber 14 by interconnecting duct 16.

The stern seal 18 as shown is the subject matter of another patent application; however, the type of stern seal 18 is not considered a feature of the instant invention and may take the form of any known and conventional type which includes a pressurizable stern plenum chamber.

An opening 20 leads from the forward end of duct 16 and extends to the cylinder 22 forward of piston 24 which is slideably sealed and operable in the cylinder 22 for linear movement therein, as hereinafter explained. The area of the cylinder 22 aft of the piston 24 is filled with fluid under pressure. Although hydraulic fluid is preferable, any other type of pressurable fluid could be utilized equally as well to practice the invention. The hydraulic fluid is pressurized to a desired level of pressure by any conventional pressure generating means not shown.

A connecting rod 26 is attached to the rear of piston 24 away from the opening 20 within cylinder 22. This connecting rod 26 extends through the aft wall 28 of the cylinder 22 and maintains a slideable sealed relationship with the wall. Within cylinder 22 between the piston 24 and the rear wall 28 surrounding the connecting rod 26 is a return spring 30. For low magnitudes of cushion pressure oscillations or oscillation frequencies exceeding 5.64 cycles per second, for example, in a 2,000 ton surface effect ship the connecting rod 26 is balanced by the return spring 30 into the extreme stop position of the valves 32, 34; i.e., valve 32 is fully opened and valve 34 is fully closed.

The connecting rod 26 extending beyond wall 28 is pivotally attached at 36 to a lever 38. The lever 38 is pivotally attached to a link 40 at 42 intermediate its ends. The lever 38 is further attached to the ship structure at 44, a point intermediate points 36 and 42. The lever 40 is pivotally attached at each end at points 46, 48, which operates valves 32, 34, respectively. The movement of the lever 38 along arrow 37 by either the action of piston 24 or manually by the upper handle of lever 38 coordinates the opening and closing of the valves so that when valve 32 is closed, valve 34 is open, and when valve 32 is open, valve 34 will be closed. The valves may both be partially open between the range of movement of lever 38. The valves 32, 34 are comprised of louvers 50. These louvers are aerodynamically shaped to reduce the pressure drop there-across and are hinged at a point 52 close to the aerodynamic center of each louver 50 so as to produce low resultant forces on the piston and connecting rod assembly 24, 26, respectively.

A hereinbefore mentioned, for a 2,000 ton surface effect ship, the heave alleviation mechanism must exhibit a natural frequency of no less than 5.64 cycles per second and the area ($A_o$) within cylinder 22 must provide a damping constant equal to or greater than 0.75 at this specific frequency. Other weights of ships may exhibit different natural frequencies and may have a damping constant of a different value. This damping constant prevents forced oscillation at near smooth surface water conditions and at the same time provides for the necessary response time to track high amplitude low frequency effect on cushion pressive excursions from a prescribed nominal.

The override feature is provided by manual operation of handle 49 of lever 38. This feature provides a manual override of the cushion pressure control mechanism in the event of a malfunction so that the stern seal 18 can be placed in a completely passive mode. The override feature additionally provides for a rapid release of the stern seal plenum chamber pressure to cause the stern of the ship to drop immediately. This latter feature is desirable in controlling the craft in the event of plowing or a failure of the ship's bow seal. The central cushion pressure is set by this relationship:

$$Pc = \frac{Ks}{Ap} X_o + P_1 \left(1 - \frac{Ar}{Ap}\right)$$

where,

Pc = pressure of cushion 12
Ks = constant of spring 30
Ap = cross-sectional area of the piston 24
$X_o$ = the nominal displacement of spring 30 corresponding to the maximum spring extension stroke
$P_l$ = fluid pressure
Ar = the cross-sectional area of connecting rod 26

The fluid pressure $P_1$, therefore, has a 1:1 correspondence with the balanced cushion setting. The balanced cushion pressure setting in turn corresponds to a given heave height (partial cushion operation) since the hull sidewalls (not shown) tend to reduce the equilibrium cushion pressure with immersion. A change in hydraulic pressure $P_1$ will control the heave of the craft at the desired partial or full cushion mode. Depending on the weight of the craft, partial cushion heave settings will vary with values of hydraulic pressure. This system insures that no downstops are used on the stern seal and that the seal is free to employ its heave alleviation function even on partial cushion.

DESCRIPTION OF THE SECOND PREFERRED EMBODIMENT

Figure 2:
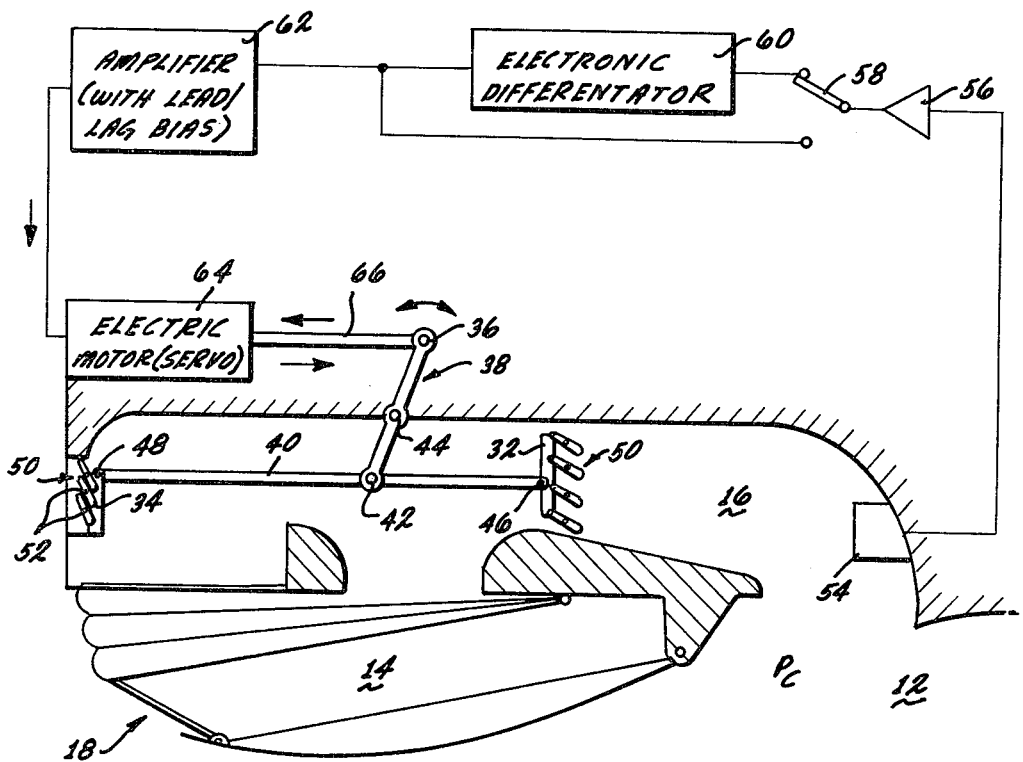
FIG. 2 shows a partial cutaway of the stern of a surface effect ship employing a second embodiment of the instant invention.
Figure 3:
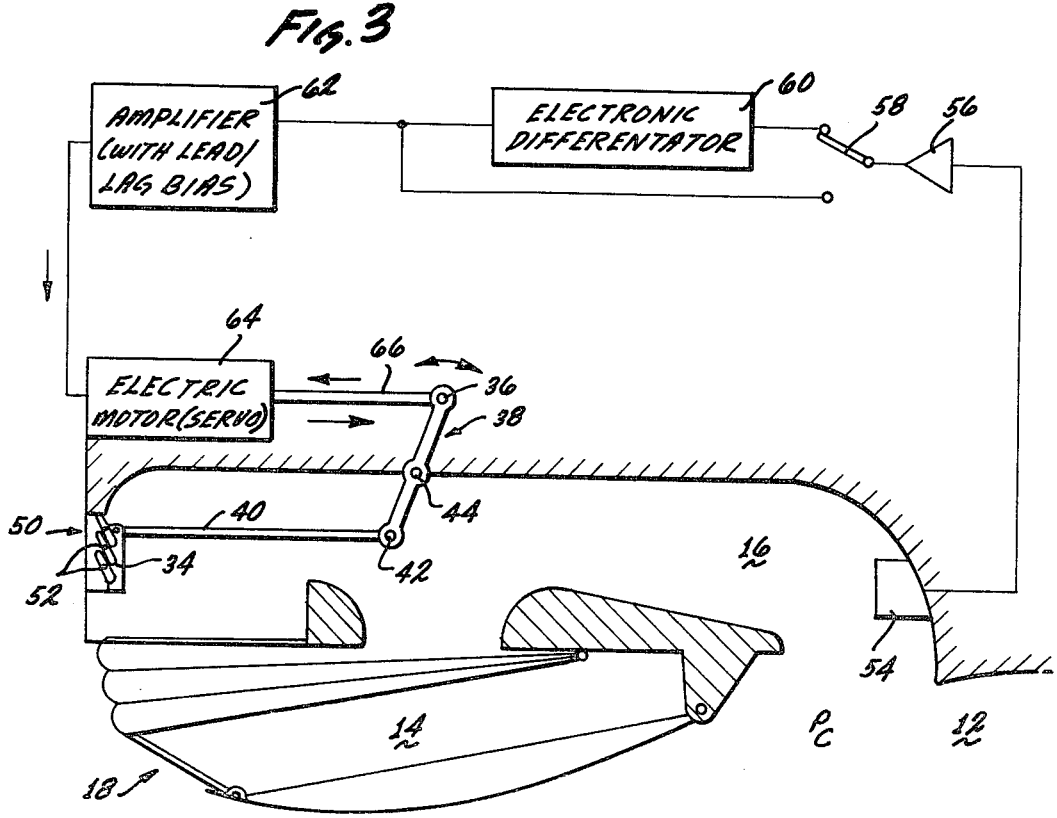
FIG. 3 shows a partial cutaway of the stern of a surface effect ship employing a third embodiment of the instant invention.

Referring now to FIG. 2, this embodiment follows the same concept of the FIG. 1 embodiment but utilizes a different means of accomplishing the same result.

Cushion pressure (Pc) is applied to a pressure transducer 54 which supplies a voltage level corresponding to that pressure. This signal is supplied to one input of comparator 56 which compares this level with a reference source supplied to it by other input (not shown) in the manner of a conventional comparator which compares its two input voltages and produces a voltage output equal to their differences. When the two inputs are equal, there is no output. The output of comparator 56 is connected to the station of two position switch 58. The FIG. 2 position of the switch 58 provides an input from comparator 56 to an electronic differentiator 60 which provides a differentiated output of any voltage present at the output of comparator 58. In the opposition position of switch 58, the electronic differentiator input is bypassed and the output of comparator 58 is fed directly into a lead/lag amplifier 62 which amplifies its input signal for supplying sufficient drive to position electric servo motor 64 which operates rod 66 which has the same purpose as connecting rod 26 of the FIG. 1 showing. The control works the same as that of FIG. 1. The change in plenum pressure Pc through the associated electronics operator lever 38 which controls valves 32, 34 in the same manner hereinbefore discussed.

DESCRIPTION OF THE THIRD PREFERRED EMBODIMENT

This embodiment works in the same manner of the second preferred embodiment hereinbefore discussed with the exception that valve 32 has been eliminated and the only pressure control is through valve 34 to atmosphere.

While particular embodiments of the invention have been shown and described, it is not intended to limit the same to details of the construction set forth, but instead the invention embraces such changes, modifications and equivalents of the various parts and their relationships as come within the purview of the appended claims:

Having thus described the invention, what is claimed as new and useful and desired to be secured by U.S. Letters Patent is:

1. Heave alleviation and control apparatus for a surface effect ship, said ship having pressurized central and stern seal plenum chambers with ducting therebetween, said apparatus comprising:
    an opening between said stern seal plenum chamber and the atmosphere;
    a first valve means positioned in said opening; and
    control means responsive to the pressure of said central plenum chamber including rigid valve connecting means for positively opening and closing said first valve means for maintaining a predetermined pressure in said stern seal plenum chamber.

2. The invention as defined in claim 1, additionally comprising a second valve means positioned in said ducting intermediate said plenum chambers, said second valve means being controlled simultaneously with said first valve means by said control means.

3. The invention as defined in claim 2, wherein said first and second valve means are oppositely operable, said first valve closing or opening while said second valve is opening or closing.

4. The invention as defined in claim 2, wherein said apparatus additionally comprises a manual means for actuating said first and second valve means.

5. The invention as defined in claim 2, wherein said first and second valve means comprise a plurality of louvers.

6. The invention as defined in claim 5, wherein said louvers are aerodynamically shaped to reduce pressure drop there-across and are hinged close to their aerodynamic center to reduce operating forces.

7. The invention as defined in claim 2, wherein said control means comprises:
    a source of fluid under selected pressure;
    a linear actuator having a cylinder with a piston therein, said piston being exposed to the central plenum pressure on one side thereof and said fluid pressure on the opposite side thereof; and
    linkage means interconnecting said first and second valve means and said piston for actuating said valve means between their open and closed positions.

8. The invention as defined in claim 1, wherein said control means comprises a servo system, said servo system comprising central plenum chamber pressure sensing means, electronic circuit means responsive to said sensing means for supplying an output signal related thereto and electro-servo motors controlled by said output signal of said electronic circuit means for operating said first valve means.

9. The invention as defined in claim 2, wherein said control means comprises a servo system, said servo system comprising central plenum chamber pressure sensing means, electronic circuit means responsive to said sensing means for supplying an output signal related thereto and electro-servo motors controlled by said output signal of said electronic circuit means for operating said first and second valve means.

* * * * *